Patented Nov. 3, 1942

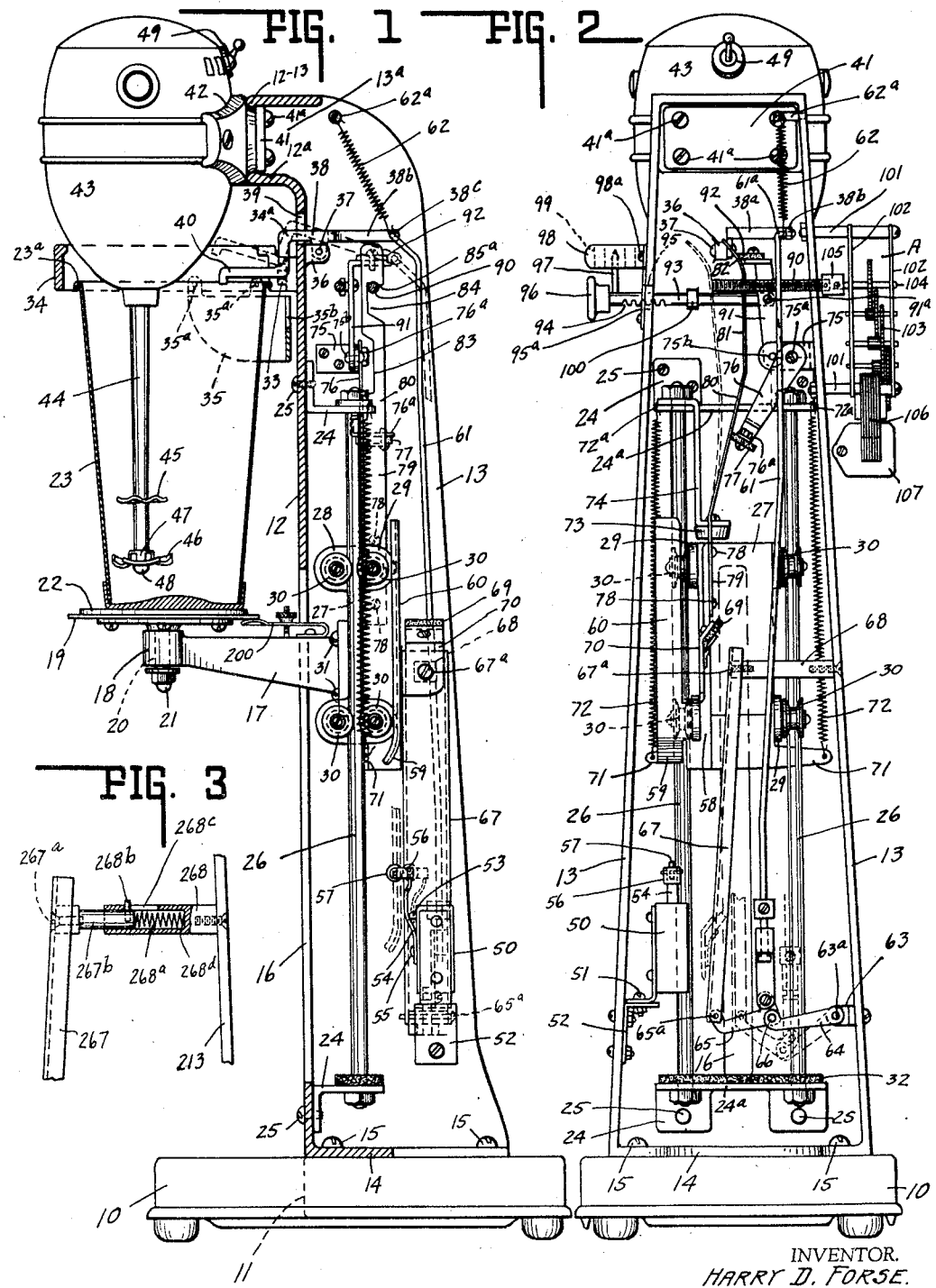

2,300,542

UNITED STATES PATENT OFFICE 2,300,542

AUTOMATIC FOUNTAIN MIXER

Harry D. Forse, Anderson, Ind.

Application September 25, 1941, Serial No. 412,274

13 Claims. (Cl. 259—108)

This invention relates to a so-called drink mixer.

The chief object of this invention is to provide a drink mixer which is semi-automatic in character, in that upon presentation of a mixing vessel with ingredients therein to be mixed, to the device, the mixing action is automatically initiated, the support for the vessel is automatically positioned for supporting purposes and the mixing duration control mechanism is automatically initiated.

Another object of the invention is to provide a device of the aforesaid character with suitable means whereby upon the expiration of the mixing interval, the mixing vessel is lowered from the mixing element and the mixing element rotation is stopped.

Another object of the invention is that in this latter movement, the mixing element continues rotation as the mixing element and the mixing vessel initially separate so that the material on the mixing element is discharged therefrom, prior to complete separation of the vessel and the mixing element, thereby reducing drippage, etc.

Another object of the invention is to provide a control for regulating the duration of the mixing interval whereby the same may be expeditiously adjusted for different materials.

Another object of the invention is to provide a control in association with a multi-speed motor whereby the mixing element may be rotated at any one of a plurality of selected speeds as required by the ingredients to be mixed.

A further object of the invention is to associate the mixing vessel and the support so that when the ingredients to be mixed are being mixed, the vessel will slowly rotate about the axis of the support for complete admixture of the said ingredients in the mixing vessel for the mixing element axis is eccentric thereto.

The chief feature of the invention consists in providing a device with the various instrumentalities and controls necessary to accomplish any or all of the aforesaid objectives.

Other objects and features will be more fully described hereinafter.

The full nature of the invention will be understood more fully from the accompanying drawing and the following description and claims:

In the drawing, Fig. 1 is a side elevation of an automatically timed drink mixing device, embodying the invention, with the mixing vessel associated therewith, the parts being shown in the mixing position, certain of the parts being broken away and shown in section to show other parts in elevation, and dotted lines corresponding to full lines indicating a second position of the full line parts.

Fig. 2 is a rear elevation of the device, the vessel being omitted therefrom.

Fig. 3 is a side elevational of a modified form of a portion of the invention, parts being broken away and shown in central section.

In the drawing, 10 indicates a base structure which is preferably of hollow flange type and which is provided with a central forward reentrant portion 11. Suitably secured to the central portion of the base structure is a U-shaped frame having the forward face portion 12 and the two side portions 13, the same forming a channel which gradually decreases in width and in depth as it increases in elevation. The lower end of this structure is provided with a base flange 14 and by the same through the means 15, said upright arrangement or frame is secured to the base. The forward portion 12, as shown, is provided with an elongated slot 16.

This slot 16 slidably receives a forwardly and outwardly directed arm 17, the arm 17 terminating in a bearing structure 18 which rotatably supports a platform or disc 19, by means of a pivot structure 20 secured as at 21. The upper face of this disc is provided with a friction mat 22, preferably of rubber, and having a roughened upper face so that a vessel 23 when placed thereon will be retained thereon and yet the vessel and disc will freely rotate upon the arm.

Above and below the slot 16 and at opposite sides of the slot, are angle brackets 24 suitably secured as at 25 to the rear face portion 12 of the upright frame. These brackets are apertured and suitably associated therewith and secured thereto are the two parallel rod members 26. These rod members constitute a guide and slide arrangement for a carriage. This carriage includes a plate portion 27 with forwardly and rearwardly directed arm portions 28 and 29 at each side and at the top and bottom of the plate portion 27. The plate portion is positioned substantially coplanar with the common plane of the guide rods 26.

Each of the arm portions 28 and 29 rotatably mounts a grooved pulley 30, as illustrated, and these grooved pulleys in pairs include therebetween the rods 26. Hence, the carriage 27 may move freely up and down in a path determined by said rods and, therefore, the plate 27 moves in the plane of said rods and by reason of the grooved pulley structure is prevented from cocking or lateral movement in said plane. The rear end of the forwardly projecting disc and vessel and supporting arm 17 is suitably secured as at 31 to this carriage structure, including the plate 27 and grooved puleys 30.

As shown in Fig. 2, the two angle bracket members 24 may be united together as at 24a and there also may be secured thereto or positioned thereon a cushion or bumper structure 32 which upon carriage descent will, unless the carriage is stopped previous to bottom engagement, cushion and silence such engagement.

Suitably secured as at 33 to the upper forward face portion 12 of the frame structure is a ring arrangement 34. This ring arrangement is so positioned that the upper edge 23a or rim of the mixing vessel 23, will lie within said ring when the vessel is positioned in juxtaposition to the mixing element for mixing purposes and is supported upon the forwardly projecting arm 17 through the rotatably mounted disc carried thereby.

Depending from said ring structure is a partially circular depending skirt 35 secured as at 35a to the ring 34. Herein, but the same is not necessary, the ring 34 is split substantially at its median element immediately adjacent the face 12 and if desired, the skirt 35 may be similarly split, as indicated at 35b. The purpose of this split arrangement is to provide clearance for a lever construction which is pivoted at 37 in brackets 36 interiorly of the frame and the arm portion 38 of said lever extends through a slot 39 in the forward face 12 in alignment with the slot 16 and in rear of the cutout portions 34a and 35b.

The portion 38 terminates in an angular arrangement 40 which is adapted to be engaged by the rim 23a of the vessel 23 when the vessel is initially positioned upwardly in juxtaposition to the mixing element and within the guard structure. This is the manual control operation for initiating cyclic operation.

The two side portions 13 of the frame are turned inwardly and forwardly as at 13a and the forward face 12 is turned forwardly as at 12a. An angular portion 12—13 unites the two side members 13 at other upper forward ends and also connects the two side members 13 and closes the forward upper portion of the frame structure providing a base to which is secured the bracket or plate 41, the same being secured by means 41a to the base portion 42 carried by a motor 43. Therefore, this motor is supported with its projecting shaft 44 depending from said motor and the axis of the shaft 44 is substantially parallel to the axis of the rods 26 and but slightly offset from, as shown in Fig. 1, the axis of the disc 19.

The mixing shaft 44 may include any suitable form of mixing impeller, that herein shown including an upper corrugated disc 45 and the lower one including pivotally supported blades 46 carried by a hub structure 47 secured upon the lower end of the shaft 44 as at 48.

The motor mounts a switch 49. This switch may be moved to the right in Fig. 2 for one speed or to the left in said Fig. 2 for a second speed.

For clearness, the circuit wires to the motor are omitted. Likewise, the circuit wires to the timer device are omitted as well as the supply to both and the circuit through the control switch. This control switch includes a switch housing 50 supported as at 51 upon a bracket 52 secured to one of the side frame members 13.

The switch housing has projecting therefrom as at 53 a switch member.

A resilient member 54, secured to the housing as at 55, normally extends upwardly and terminates in a yoke 56 in which is rotatably mounted a roller 57. The carriage structure previously described, has adjustably mounted thereon as at 58 a laterally projecting portion 59 which extends upwardly as at 60. This elongated upwardly directed member 60 is arranged to cooperate with the roller 57 in order that when the carriage is down, the arm 54 moves member 53 inwardly into the switch housing. This is the open circuit position of the included switch structure.

When the carriage is elevated and the roller 57 no longer is engaging the operating portion 60, before mentioned, the switch member 53 is extended from the housing and the motor circuit and timing mechanism is in closed circuit relation and the motor immediately starts to operate as well as the timing mechanism.

When the carriage is released after the expiration of the proper mixing interval, it will be apparent that by reason of the relative length of the member 60 and the upward extension of the arm 54, that the motor circuit and timing mechanism are opened prior to the complete lowering of the arm 17 and disc with the carriage 27 etc. into the lowermost position.

The arm 38 within the frame structure is directed laterally as at 38a and then is directed rearwardly as at 38b—see Figs. 2 and 1, respectively. Rod 61 has an angular end 61a secured in an opening 38c in the free end of the arm portion 38b and at this connection there also is secured one end of a spring 62, the other spring end being secured as at 62a to one side frame member 13. Hence, spring 62 normally constrains the manually operable control lever 40—38 and the rod 61 upwardly or counterclockwise, see Fig. 1.

Pivotally supported on a bracket 63 as at 63a is a link 64, in turn pivoted to a link 65 at 66. The other end of the link 65 is pivotally connected as at 65a to a comparatively wide—see Fig. 1—and comparatively long brake plate member 67, the latter being somewhat loosely mounted as at 67a upon a post 68 carried by the same side frame member that mounts the bracket 63. When the arm portion 40 of the main control lever is tilted upwardly, the portion 38b thereof is tilted downwardly in opposition to the constraining spring 62.

In this movement, the toggle structure, which is normally constrained to the aligned position, is converged as shown by the dotted lines in the lower right hand portion of Fig. 2 and in so doing, the brake plate 67 is moved from the full line position to the dotted line position or toward the right hand side frame member 13. When this occurs the shoe 69 which may be of fibre or rubber, carried by the arm portion 70 is released from the plate 67 and hence, the carriage is free from the braking arrangement, because this shoe structure is carried by the carriage.

The carriage has two laterally directed wings 71 and to each at its outer end is secured the lower end of a spring 72, the upper end of which is secured as at 72a to the angle brackets 24 which, as previously stated, may be connected together as at 24a. Hence, upon release of the shoe from the elongated plate member, the carriage under the influence of the two long tension springs 72 is immediately caused to elevate and this elevational movement continues until the carriage or plate 27 engages an upper cushion stop 73 carried by the angular arm 74 in turn carried by one of the rods 26, as shown. This limits the upward movement of the carriage, and this position insofar as the disc 19 is concerned, is such that the disc and friction layer thereon is positioned about ½" below the bottom of the vessel 23 when it is held in its uppermost position against the arm 40 when the latter is held elevated manually.

Accordingly, the dispenser after applying the ingredients to the vessel, positions the same within the guard ring and pushes upwardly on the vessel until arm 40 limits further upward movement and in so doing, the elongated brake member is released and the carriage elevates and the disc is positioned immediately below the vessel, as before stated. Simultaneously with this elevational action and substantially at the initial part thereon, the switch controlling roller and elongated member 60 separate so that current is supplied to the timing mechanism and the motor.

Immediately beneath the arms 38a and 38b there is secured to the side frame 13, which also mounts members 63 and 68, a bracket 75. This bracket 75 has adjustably mounted thereon as at 75a an arm 76. This arm 76 has a lateral portion 76a and to the same is secured a cushion or like member which may be of fibre or rubber, the same being indicated by the numeral 77.

The carriage has secured to it as at 78 a flat spring-like member 79 having an upwardly and laterally directed portion 80 and a vertical portion 81 and an upwardly and oppositely directed end portion 82. The vertical portion 81 includes two oppositely and inwardly directed notches 83 and 84. When the carriage is in its lowermost position, the elongated spring-like member described, is free from the member 77 but in the elevating movement of the carriage, as previously described, the portion 82 engages the same and in the further upward movement, the spring-like member is caused to be moved—see Fig. 2—to the left and the edge of the member 77 rides the so-called vertical portion 81 of this elongated spring-like member until the inclined portion 80 engages the member 77. Further upward movement of the carriage then, in addition to elevating the spring-like member, permits said spring-like member upper end to move toward the right—see Fig. 2—and thus the upper inclined portion 82 engages the end of a threaded member 90. The continued upward movement of this carriage then registers this threaded member 90 with the aperture or notch 85 whereupon the upper edge of the notch 85a engages in the thread of the member 90.

At this time it is to be observed that in the absence of any other stop, the right hand movement of the elongated spring member is now limited by the member 77 bearing on the upwardly and laterally inclined portion 80 of the elongated spring-like member.

It will be apparent, therefore, that if the threaded member 90 is properly rotated after having been associated with the edge 85a of the elongated spring-like member, the spring-like member in opposition to its constraint will gradually be moved, insofar as its notched portion 81 is concerned, toward the left—see Fig. 2—until such time as it leaves the thread at the free end of this member 90. When it leaves the thread at the end of this member 90, the weight of the vessel together with its contents is such that the carriage, being now released having been solely suspended by its elongated spring member, drops and the movement thereof toward the end is cushioned by the member 69 engaging the inclined or brake-like plate member 67, until lowering movement is finally stopped, or until the cushion 32 is engaged. Long prior to this, however, as previously set forth, the member 60 has engaged the roller 57 of the switch arm structure so that the motor of the mixing unit has ceased rotation and the timing mechanism has also been deenergized so that the screw 90 no longer is rotated.

The bracket 75 at its forward end 75b pivotally supports an arm 91 and the upper end of this arm mounts a member 92 similar to the member 77. Intermediate the ends of this arm, as at 91a, there is pivoted a member 93 having notches 94 therein. This member 93 is slidable longitudinally through an opening 95 in the side portion 13 opposite the side portion 13 that carries the bracket 75.

The member 93 at its outer free end, mounts a finger piece or knob 96. There also may be provided, if desired, an indicating finger 97 which is associated with the scale element 98 secured as at 98a and having legending 99 thereon. When the member 93 is pulled out to its extreme position, determinable by a collar 100 adjustably mounted on said rod, the elongated member is just prevented from seating engagement with the rotatable threaded member 90. Whenever the rod is moved inwardly so that one of the slots registers with a retaining element adjacent the opening 95, and designated by 95a, the position of member 92 determines the initial engaging or thread seating position of the elongated flexible carriage suspending member. Hence, if the knob is moved to the fullest extent, the seating position aforesaid is determined by the member 77. Any intermediate position causes the member 92 to determine the initial thread seating position of the elongated member with respect to the member 90 so that as the knob 96 is moved to the left in Fig. 2, the resulting time interval that the shaft 90 is rotated from the time it starts rotation until it ceases, is correspondingly decreased.

The aforesaid, herefore, constitutes a manual determination of the desired time interval operation including mixing.

It will be quite apparent that certain ingredients can be mixed at a shorter time than other and stiffer ingredients. So that, if there is a stiff mixture utilized the knob may be positioned immediately adjacent the side member 13 for mixture mixing duration. When a lighter mixture is utilized, a lesser interval may be utilized and thus excessive mixing can be avoided.

The remaining mechanism requiring description, is that in the timing arrangement. Herein there is carried in spaced relation, as at 101, and by the right hand frame member 13—see Fig. 2—a power mechanism indicated generally by letter A and having the two parallel plates 102 between which are mounted the various gears and pinions, indicated generally by the numeral 103, the last gear in the train being suitably connected by means of its shaft 104 as at 105 to the threaded member 90. The lowermost gear 103 meshes with a pinion, not shown, which initial pinion in the train is rigid with the rotor shaft associated with the laminated field structure 106 carried by the frame arrangement A and with which is associated the winding arrangement broadly indicated by the numeral 107.

When the member 60 is elevated, as previously described, the arm 54 moves to the left under its inherent constraint—see Fig. 1—permitting the switch member 53 to move outwardly from the switch construction for closing the switch and thereby closing the circuit to the portion 107 so that this induction motor arrangement is immediately energized for gear train operation and threaded member 90 rotation.

Simultaneously therewith, as previously described, the motor circuit is closed and the shaft 44 is rotated at one of the selected speeds determinable by switch 49 if included.

Since it has been previously described how the carriage is released so that it may be elevated by the springs 72 and only when the member 40 is elevated, and since it has been described how upon termination of the mixing interval determined by the thread arrangement and the adjustable association of the elongated spring-like carriage suspending member therewith and the lowering movement of the carriage, vessel and contents upon such termination of the mixing interval, no further description of operation is believed necessary.

The following, however, is pointed out: The axis of the disc 19 is parallel to the rods 26. The axis of the shaft 44 is parallel thereto but the axis of the shaft 44 is slightly offset from the axis of the disc. Hence, in the rotation of the shaft 44 and its impellers or mixing elements, not only is the material in the vessel rotated and mixed but the entire vessel and contents rotate about the disc axis and the disc moves with the vessel.

The timing also is of such character as previously described, that in the lowering of the vessel and its contents, the shaft 44 continues to rotate during part of this lowering movement so that it is enabled to free the impellers 45 and 46 of any solid ingredients that may have accumulated thereon and be retained thereon by reason of mass inertia, since as the vessel drops, the lighter portion of the mixture will be near the top of the vessel and accordingly, the resistance to discharge of the larger masses immediately associated with the impellers proper will be less and such particles accordingly will be discharged.

The vessel support, as shown in Fig. 1, has associated therewith an adjustable brake which engages the support applying friction in the desired amount to sufficiently retard rotation of said support for otherwise it would rotate too fast. The separation movement is initially faster than the final separation movement.

In Fig. 3 there is illustrated a modified form of brake plate upper mounting. Herein numerals of the 200 series designate same or similar parts shown in Figs. 1 and 2 and designated by the primary numerals.

In Fig. 3 the support 268, pivoted at end to the plate member 267 at 267a and rigidly mounted on frame 213 is illustrated as of telescopic type and normally constrained by spring 268a toward extended relation. This extension is limited by pin 268b riding in slot 268c and carried by portion 267b of support 268 including well 268d which receives portion 267b and spring 268a.

The operation is as follows: Note that the extended position of the upper end of the plate 267 does not overhang the lower end when tilted to the dotted line position shown in Fig. 2; hence, when so positioned, plate member 267 does not interfere with the release and free upward travel of shoe member 69 etc. When descending the initial engagement of shoe member 69 with plate member 267 will be cushioned.

In Fig. 1 an adjustable friction member 200 may be provided to limit rotation of disc 19 when disassociated from mixer 44 etc.

While the invention has been illustrated and described in great detail in the drawing and foregoing description, the same is to be considered as illustrative.

The several modifications described herein as well as others which will readily suggest themselves to persons skilled in this art, all are considered to be within the broad scope of the invention, reference being had to the appended claims.

The invention claimed is:

1. A drink mixer including a motor and mixing element rotatable thereby, a frame supporting the motor in overhead relation and with the mixing element in depending relation, a vessel support reciprocable upon the frame, means constraining the support to upper position, the constraint being less than the weight of the vessel, the support and usual vessel content, an upper stop for the vessel, means adjacent thereto and automatically operable by the manual positioning of the vessel against the stop to release the support to its constraint, an electrically operable time determining device, said time device and motor being simultaneously operable upon stop engagement by the vessel, means automatically associated with the time device upon support release to its constraint, said last mentioned means retaining the vessel, contents and support in elevated relation until predetermined time elapse, and means operable automatically, in the descent of the vessel, contents and support when released, and in opposition to the support constraint, for stopping the motor and time device.

2. A device as defined by claim 1, characterized by the addition of manually adjustable means for the time device associated means for determining the duration of association of the time device associated means and the time device.

3. In a drink mixer, the combination of an upright guide arrangement, a carriage reciprocable thereon, a shoe carried by the carriage, an elongated biased positioned brake plate movable mounted adjacent shoe travel and adapted for shoe engagement to retain said carriage in one of its extreme positions, means constraining said carriage towards its other extreme position, and means for moving the brake plate to release the carriage to its constraint for carriage movement.

4. A drink mixer as defined by claim 3, characterized by the addition of an electric motor, and switch means automatically operable in carriage movement for motor control.

5. A drink mixer as defined by claim 3, characterized by the addition of a time device for determining the periodicity of carriage retention in one of its extreme positions, and control means automatically operable in carriage movement for time device control.

6. A drink mixer as defined by claim 3, characterized by the addition of a time device for determining the periodicity of carriage retention in one of its extreme positions, control means automatically operable in carriage movement for time device control, and an electric motor, said control means simultaneously controlling said motor.

7. A drink mixer as defined by claim 3, characterized by the addition of a time device for determining the periodicity of carriage retention in one of its extreme positions, control means automatically operable in carriage movement for time device control, and manual means for varying the duration of time device operation.

8. A drink mixer as defined by claim 3, characterized by the addition of a time device for determining the periodicity of carirage retention in one of its extreme positions, control means automatically operable in carriage movement for time device control, an electric motor, said control means simultaneously controlling said motor, and manual means for varying the duration of time device operation.

9. In a drink mixer, a vertically reciprocable carriage, a rotatable time determining member extending transversely of the direction of carriage movement, a member carried by and movable with the carriage and adapted for operative association with the rotatable member for holding the carriage in one of its extreme positions, the duration of operative association determining the carriage holding period, and releasable means for holding the carriage in its other extreme position when released by disassociation of said members.

10. In a drink mixer, a vertically reciprocable carriage, a rotatable time determining member extending transversely of the direction of carriage movement, a member carried by and movable with the carriage and adapted for operative association with the rotatable member for holding the carriage in one of its extreme positions, the duration of operative association determining the carriage holding period, releasable means for holding the carriage in its other extreme position when released by disassociation of said members, and manual means for initially adjusting the relative positions of said members for determining the holding period.

11. A one-hand operable drink mixer including an upwardly directed support, a mixing shaft element depending therefrom and power operable, a vessel support element therebeneath, a control for shaft rotation, a catch for retaining at least one of the elements in close proximity to the element for mixing purposes, a single control member operable by one-hand movement of one element toward the other for actuating the catch, and other means arranged after a predetermined interval to automatically release the catch to cause element separation.

12. A device as defined by claim 3, characterized by the addition of yielding means supporting the upper end of the brake plate, and yieldably upon initial engagement of the shoe with the plate for cushioning said engagement.

13. A device as defined by claim 3, characterized by the addition of yielding means supporting the upper end of the brake plate, and yieldably upon initial engagement of the shoe with the plate for cushioning said engagement, and means limiting the movement of the brake plate in braking direction whereby upon actuation of the brake plate moving means, the upper end of the plate offers no impediment to free elevational movement of the shoe.

HARRY D. FORSE.